United States Patent
Chakravarty et al.

(10) Patent No.: US 12,197,208 B2
(45) Date of Patent: Jan. 14, 2025

(54) CAMERA CALIBRATION

(71) Applicant: Ford Global Technologies, LLC, Dearborn, MI (US)

(72) Inventors: Punarjay Chakravarty, Campbell, CA (US); Shubham Shrivastava, Sunnyvale, CA (US); Bhushan Ghadge, Sunnyvale, CA (US); Mostafa Parchami, Ann Arbor, MI (US); Gaurav Pandey, College Station, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 512 days.

(21) Appl. No.: 17/515,855

(22) Filed: Nov. 1, 2021

(65) Prior Publication Data

US 2023/0136871 A1 May 4, 2023

(51) Int. Cl.
    *G05D 1/00* (2024.01)
    *G06T 7/70* (2017.01)
    *G06T 7/80* (2017.01)

(52) U.S. Cl.
    CPC ............. *G05D 1/0033* (2013.01); *G06T 7/70* (2017.01); *G06T 7/80* (2017.01);
    (Continued)

(58) Field of Classification Search
    CPC ......... G05D 1/0033; G05D 2201/0213; G05D 1/0038; G05D 1/00; G06T 7/70;
    (Continued)

(56) References Cited

U.S. PATENT DOCUMENTS

| | | | |
|---|---|---|---|
| 10,029,622 B2 | 7/2018 | Brown et al. | |
| 11,729,371 B2 * | 8/2023 | St. John | H04N 9/67 |
| | | | 382/104 |

(Continued)

FOREIGN PATENT DOCUMENTS

| | | |
|---|---|---|
| CN | 107067755 A | 8/2017 |
| CN | 110661984 A | 1/2020 |

(Continued)

OTHER PUBLICATIONS

Zhou et al., "Objects as Points", CenterNet, arXiv 1904.07850.

*Primary Examiner* — Shardul D Patel
(74) *Attorney, Agent, or Firm* — Frank A. MacKenzie; Brooks Kushman P.C.

(57) ABSTRACT

A first plurality of center points of first two-dimensional bounding boxes corresponding to a vehicle occurring in a first plurality of images acquired by a first camera can be determined. A second plurality of center points of second two-dimensional bounding boxes corresponding to the vehicle occurring in a second plurality of images acquired by a second camera can also be determined. A plurality of non-linear equations based on the locations of the first and second pluralities of center points and first and second camera parameters corresponding to the first and second cameras can be determined. The plurality of non-linear equations can be solved simultaneously for the locations of the vehicle with respect to the first and second cameras and the six degree of freedom pose of the second camera with respect to the first camera.

20 Claims, 8 Drawing Sheets

(52) U.S. Cl.
CPC ............... *G06T 2207/20084* (2013.01); *G06T 2207/30244* (2013.01); *G06T 2210/12* (2013.01)

(58) Field of Classification Search
CPC ............. G06T 7/80; G06T 2207/20084; G06T 2207/30244; G06T 2210/12; G06T 2207/10021; G06T 2207/10028; G06T 2207/30232; G06T 2207/30236; G06T 2207/30241; G06T 7/246; G06T 2207/20081; G06F 17/12; G06N 3/08
USPC ............................................................ 701/2
See application file for complete search history.

(56) References Cited

U.S. PATENT DOCUMENTS

| | | | |
|---|---|---|---|
| 2009/0231436 A1* | 9/2009 | Faltesek | G06V 10/147 348/169 |
| 2012/0288145 A1* | 11/2012 | Kido | G06V 20/58 382/165 |
| 2019/0096086 A1* | 3/2019 | Xu | G01S 13/931 |
| 2019/0204425 A1* | 7/2019 | Abari | G05D 1/0011 |
| 2019/0291723 A1* | 9/2019 | Srivatsa | G05D 1/0221 |
| 2020/0249032 A1* | 8/2020 | Lee | G09B 29/003 |
| 2021/0209785 A1* | 7/2021 | Unnikrishnan | G01S 7/41 |
| 2021/0383616 A1* | 12/2021 | Rong | G06T 17/10 |
| 2022/0012916 A1* | 1/2022 | Srinivasan | G06V 20/56 |

FOREIGN PATENT DOCUMENTS

| | | |
|---|---|---|
| CN | 111968071 A | 11/2020 |
| EP | 3703008 A1 | 9/2020 |

* cited by examiner

CAMERA CALIBRATION

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more images sensors that can be processed to determine locations of objects. Object location data extracted from images can be used by a computer to operate systems including vehicles, robots, security, and object tracking systems.

DETAILED DESCRIPTION

Figure 1:
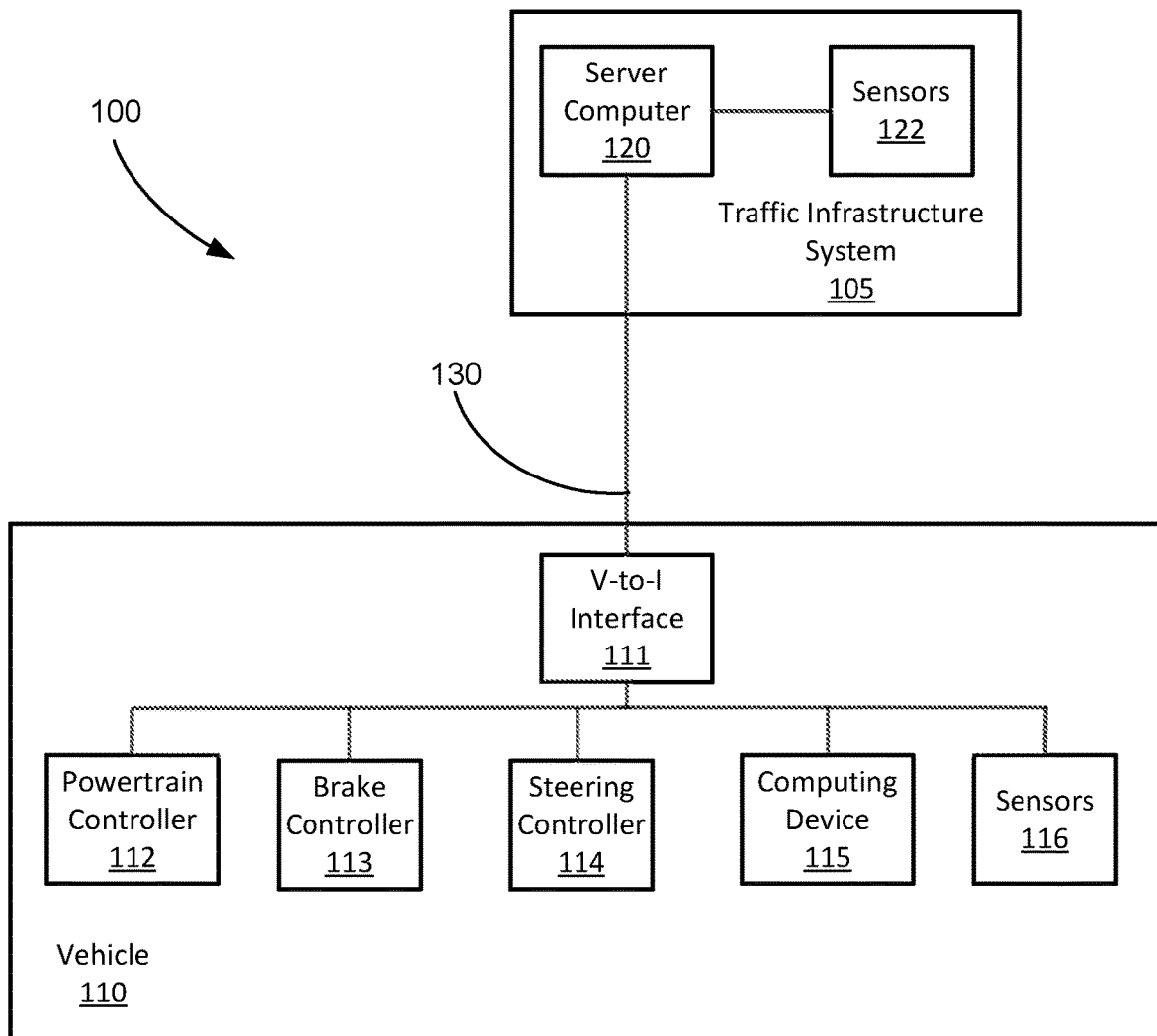
FIG. 1 is a block diagram of an example traffic infrastructure system.

A sensing system can acquire data, for example image data, regarding an environment around the system and process the data to determine identities and/or locations of objects. For example, a deep neural network (DNN) can be trained and then used to determine objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a computer to detect objects, for example vehicles and pedestrians, in a traffic scene and determine a vehicle path for operating a vehicle based on the detected objects. A traffic scene is an environment around a traffic infrastructure system or a vehicle that can include a portion of a roadway and objects including vehicles and pedestrians, etc. For example, a computing device in a traffic infrastructure system can be programmed to acquire one or more images from one or more sensors included in the traffic infrastructure system, detect objects in the images and communicate labels that identify the objects along with locations of the objects. The sensors can include video or still image cameras that acquire images corresponding to visible or infrared wavelengths of light. The sensors can be stationary and can be mounted on poles, buildings, or other structures to give the sensors a view of the traffic scene including objects in the traffic scene. Sensors can also include lidar sensors, which typically emit infrared wavelengths of light, radar sensors which emit radio waves, and ultrasound sensors which emit sound waves. Lidar, radar, and ultrasound sensors all measure distances to points in the environment.

In some examples a computing device can acquire one or more images of a traffic scene and communicate the image data along with data describing a location and orientation of the sensor along with data regarding camera parameters that permit a computing device in a vehicle to determine labels and real-world coordinates of objects included in the image data. The location and orientation of a sensor can be described in six degree of freedom coordinates. Six degree of freedom coordinates include x, y, and z location coordinates determined with respect to orthogonal axes of a global coordinate frame such as latitude, longitude, and altitude, and roll, pitch, and yaw orientation coordinates determined with respect to the x, y, and z axes, respectively. Sensor parameters determine how the portion of the traffic scene within the field of view of a sensor are projected onto an image plane by a lens included in the sensor to generate an image. Sensor parameters can be expressed mathematically as matrices that transforms point locations in an image to real world coordinates of locations in the real world. Sensor parameters will be discussed in relation to FIG. 2, below.

Data from sensors in a traffic infrastructure system including locations and direction of movement of objects in a traffic scene can be used to direct the motion of vehicles. For example, the location and direction of motion of pedestrians can be used to determine where and when vehicles can be permitted to operate in a traffic scene. Accuracy and reliability of data from sensors in a traffic infrastructure system can depend upon locating the sensor to determine the location and orientation of the sensors with respect to a global coordinate frame that is shared by the traffic infrastructure system and a vehicle with which it communicates. Data regarding the location of an object in sensor data acquired by a sensor in a traffic infrastructure system can be combined with data regarding the location and orientation of the sensor and sensor parameters to determine a real-world location of the object expressed in a global coordinate frame. The real-world location of the object can be communicated to a vehicle to permit the vehicle to determine a vehicle path that avoids the object in the shared global coordinate frame.

Accuracy and reliability of data from sensors in a traffic infrastructure system can be improved by acquiring two or more images from two or more sensors having overlapping fields of view. Overlapping fields of view will be discussed in relation to FIG. 2, below. Combining data from two or more sensors can be improved by determining extrinsic localization of the two or more sensors to determine six degree of freedom location and orientation for each of the sensors relative to a common global coordinate frame. Techniques discussed herein improve localization of image sensors such as video cameras by selecting a first sensor and localizing one or more other image sensors to the first sensor by acquiring a plurality of images of a moving object and solving a set of non-linear equations for the locations of the sensors and the object simultaneously. Localization of two or more image sensors in a traffic infrastructure system permits the traffic infrastructure system to combine two or more views of the same object to improve the accuracy and reliability of an estimate of a real-world location of an object in a global coordinate frame.

Disclosed herein is a method, including determining a first plurality of center points of first two-dimensional bounding boxes corresponding to locations of a vehicle occurring in a first plurality of images acquired by a first camera, determining a second plurality of center points of second two-dimensional bounding boxes corresponding to the locations of the vehicle occurring in a second plurality of images acquired by a second camera and determining a plurality of non-linear equations based on respective locations of the first and second pluralities of center points and first and second camera locations including camera parameters corresponding to the first and second cameras. The plurality of non-linear equations can be simultaneously solved for the locations of the vehicle with respect to the first and second cameras and a six degree of freedom pose of the second camera with respect to the first camera and real-world coordinates of the six degree of freedom pose of the second camera can be determined based on real-world coordinates of a six degree of freedom pose of the first camera. The motion of a second vehicle can be controlled based on the real-world coordinates of the first camera and the real-world coordinates of the second camera. First and second camera parameters can include the six degree of freedom poses of the first and second cameras. The real-world coordinates of the first camera can be determined by locating the first camera using lidar data. The first and second plurality of center points can be determined based on first and second bounding boxes by inputting the first and second pluralities of images to a convolutional neural network.

The plurality of non-linear equations can be solved using Gauss-Newton iteration. Solving the plurality of non-linear equations using Gauss-Newton iteration can include determining a Jacobian matrix of partial derivatives. The non-linear equations can be solved using a Levenberg-Marquardt algorithm. Simultaneously solving the plurality of non-linear equations for the locations of the vehicle with respect to the first and second cameras and the six degree of freedom pose of the second camera with respect to the first camera can include constraining the first and second two-dimensional bounding boxes to a plane. Simultaneously solving the plurality of non-linear equations for the locations of the vehicle with respect to the first and second cameras and the six degree of freedom pose of the second camera with respect to the first camera can include constraining the locations of the vehicle based on lidar data. Simultaneously solving the plurality of non-linear equations for the locations of the vehicle with respect to the first and second cameras and the six degree of freedom pose of the second camera with respect to the first camera can include constraining the locations of the vehicle based on one or more of global positioning system data, inertial measurement unit data and visual odometry data. Simultaneously solving the plurality of non-linear equations for the locations of the vehicle with respect to the first and second cameras and the six degree of freedom pose of the second camera with respect to the first camera can include constraining the locations of the vehicle based on map data. Simultaneously solving the plurality of non-linear equations for the locations of the vehicle with respect to the first and second cameras and the six degree of freedom pose of the second camera with respect to the first camera can include constraining the locations of the vehicle based on center points determined based on three-dimensional bounding boxes. Controlling motion of a second vehicle can include controlling vehicle powertrain, vehicle steering, and vehicle brakes.

Further disclosed is a computer readable medium, storing program instructions for executing some or all of the above method steps. Further disclosed is a computer programmed for executing some or all of the above method steps, including a computer apparatus, programmed to determine a first plurality of center points of first two-dimensional bounding boxes corresponding to locations of a vehicle occurring in a first plurality of images acquired by a first camera, determine a second plurality of center points of second two-dimensional bounding boxes corresponding to the locations of the vehicle occurring in a second plurality of images acquired by a second camera and determine a plurality of non-linear equations based on respective locations of the first and second pluralities of center points and first and second camera locations including camera parameters corresponding to the first and second cameras. The plurality of non-linear equations can be simultaneously solved for the locations of the vehicle with respect to the first and second cameras and a six degree of freedom pose of the second camera with respect to the first camera and real-world coordinates of the six degree of freedom pose of the second camera can be determined based on real-world coordinates of a six degree of freedom pose of the first camera. The motion of a second vehicle can be controlled based on the real-world coordinates of the first camera and the real-world coordinates of the second camera. First and second camera parameters can include the six degree of freedom poses of the first and second cameras. The real-world coordinates of the first camera can be determined by locating the first camera using lidar data. The first and second plurality of center points can be determined based on first and second bounding boxes by inputting the first and second pluralities of images to a convolutional neural network.

The instructions can include further instructions to solve the plurality of non-linear equations using Gauss-Newton iteration. Solving the plurality of non-linear equations using Gauss-Newton iteration can include determining a Jacobian matrix of partial derivatives. The non-linear equations can be solved using a Levenberg-Marquardt algorithm. Simultaneously solving the plurality of non-linear equations for the locations of the vehicle with respect to the first and second cameras and the six degree of freedom pose of the second camera with respect to the first camera can include constraining the first and second two-dimensional bounding boxes to a plane. Simultaneously solving the plurality of non-linear equations for the locations of the vehicle with respect to the first and second cameras and the six degree of freedom pose of the second camera with respect to the first camera can include constraining the locations of the vehicle based on lidar data. Simultaneously solving the plurality of non-linear equations for the locations of the vehicle with respect to the first and second cameras and the six degree of freedom pose of the second camera with respect to the first camera can include constraining the locations of the vehicle based on one or more of global positioning system data, inertial measurement unit data and visual odometry data. Simultaneously solving the plurality of non-linear equations for the locations of the vehicle with respect to the first and second cameras and the six degree of freedom pose of the second camera with respect to the first camera can include constraining the locations of the vehicle based on map data. Simultaneously solving the plurality of non-linear equations for the locations of the vehicle with respect to the first and second cameras and the six degree of freedom pose of the second camera with respect to the first camera can include constraining the locations of the vehicle based on center points determined based on three-dimensional bounding boxes. Controlling motion of a second vehicle can include controlling vehicle powertrain, vehicle steering, and vehicle brakes.

FIG. 1 is a diagram of a sensing system 100 that can include a traffic infrastructure system 105 that includes a server computer 120 and sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
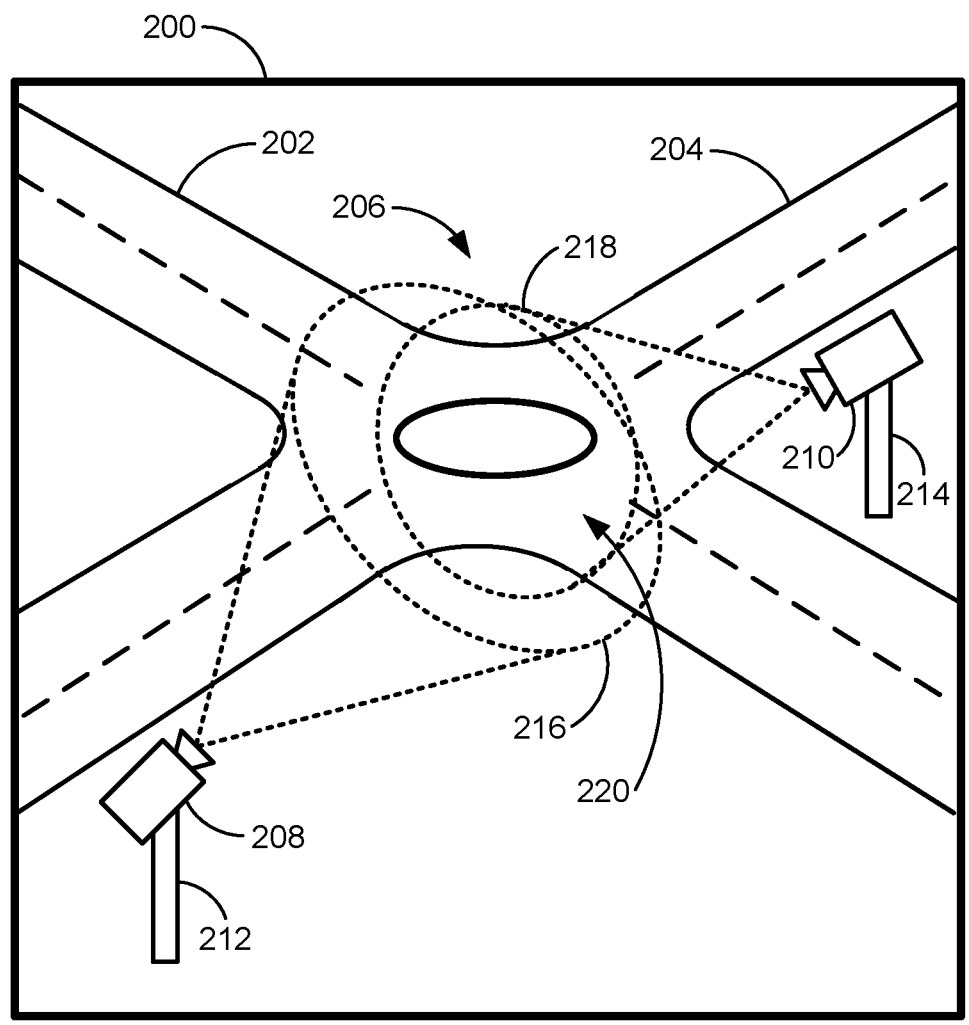
FIG. 2 is a diagram of an example image of a traffic scene.

FIG. 2 is a diagram of a traffic scene 200. Traffic scene 200 includes roadways 202, 204 that meet at a traffic circle intersection 206. Traffic circle intersection 206 is viewed by two cameras 208, 210 mounted on two poles 212, 214, respectively. Cameras 208, 210 can be sensors 122 included in a traffic infrastructure system 105, In this example, cameras 208, 210 can be video cameras that can each acquire a plurality of frames of video data, where a frame of video data is a rectangular array of red, green, and blue (RGB) pixels that correspond to a color image. Each camera 208, 210 includes a field of view 216, 218, where a field of view is the portion of the traffic scene 200 that will be included in an image acquired by the cameras 208, 210. The fields of view 216, 218 overlap, meaning that objects in the traffic scene 200 that occur in the intersection 220 of fields of view 216, 218 will be represented in respective images acquired by the cameras 208, 210 at substantially a same time, i.e., where both images are acquired within a short time period, for example one second.

Determining locations for an object in two or more images of the same portion of a traffic scene 200 acquired at substantially the same time by two or more cameras 208, 210 can improve the accuracy and reliability with which a location for an object is determined. Determining the location of an object based on two or more images acquired by two or more cameras 208, 210 depends upon camera localization. Camera localization herein means determining respective locations of the two or more fields of view 216, 218 of the two or more cameras 208, 210 with respect to the traffic scene 200 in real world coordinates. Once the locations of the fields of view 216, 218 for the cameras 208, 210 are located, objects located in images acquired by cameras 208, 210 can be determined in real world coordinates. The real world coordinates of the objects can be compared to determine the accuracy and reliability of the object's location data.

Camera localization data, i.e., locations or respective cameras' fields of view, can be determined by acquiring range data of a traffic scene 200 using a lidar. As discussed above in relation to FIG. 1, a lidar sensor can include a laser, typically operating in the infrared wavelengths, that emits pulses or modulated beams of light energy. The emitted light energy is reflected back to the lidar sensor from surfaces in the traffic scene 200, where the reflected energy is received to measure a time-of-flight of the pulses or a phase shift of the modulated beam to determine the distance or range to a location in the traffic scene 200. The light energy can be scanned to produce a point cloud corresponding to a range image of a field of view corresponding to a portion of a traffic scene 200. By measuring the location and orientation of the lidar sensor, location of points in the traffic scene 200 can be determined in real world coordinates.

Techniques discussed herein improve camera localization by determining camera localization parameters and the location of one or more second cameras 210 with respect to a first camera 208 by acquiring a plurality of images of an object in overlapping portions of the first and second sensor's fields of view 216, 218 as the object moves through the traffic scene 200. Based on the sensor parameters, a series of non-linear equations are set up and solved for unknown sensor locations and unknown object locations simultaneously. Based on this technique, a plurality of cameras 208, 210 having at least partially overlapping fields of view 216, 218 can be located with respect to a first camera 208. Because techniques described herein are based on observing an object moving in a traffic scene 200, the localization can be repeated without requiring any further intervention by a user. Locating cameras 208, 210 in this fashion is much less expensive and time consuming than locating cameras 208, 210 using a lidar or fiducial markers. Locating cameras 208, 210 in this fashion does not require an additional equipment or user intervention and can be repeated whenever a moving object travels in the overlapping fields of view 216, 218 of the cameras 208, 210. Techniques described herein can be used to locate lidar, radar, or ultrasound sensors in addition to cameras 208, 210.

Techniques described herein are based on a plurality of simultaneous observations of a moving vehicle through the common field of view of two or more cameras to constrain the six degree of freedom pose (x, y, z, roll, pitch, yaw) between the two or more cameras. Each camera has its own 2D object detector, and the 3D object is viewed as a 2D bounding box in the image plane of that object as discussed above in relation to FIG. 3, below. Because the cameras are time-synchronized to acquire corresponding images of the moving vehicle at substantially the same time, the projective geometry-based equations for the projection of the center point of the 3D bounding box of the vehicle into the image plane of each camera can be set up as a system of equations that constrains the trajectory of the vehicle in a global coordinate frame. The system of equations can also constrain the relative pose of the two or more cameras in the same global coordinate frame. The system of equations can assume that the global coordinate frame belongs to the first camera, and every successive camera can be extrinsically located relative to the first camera.

Figure 3:
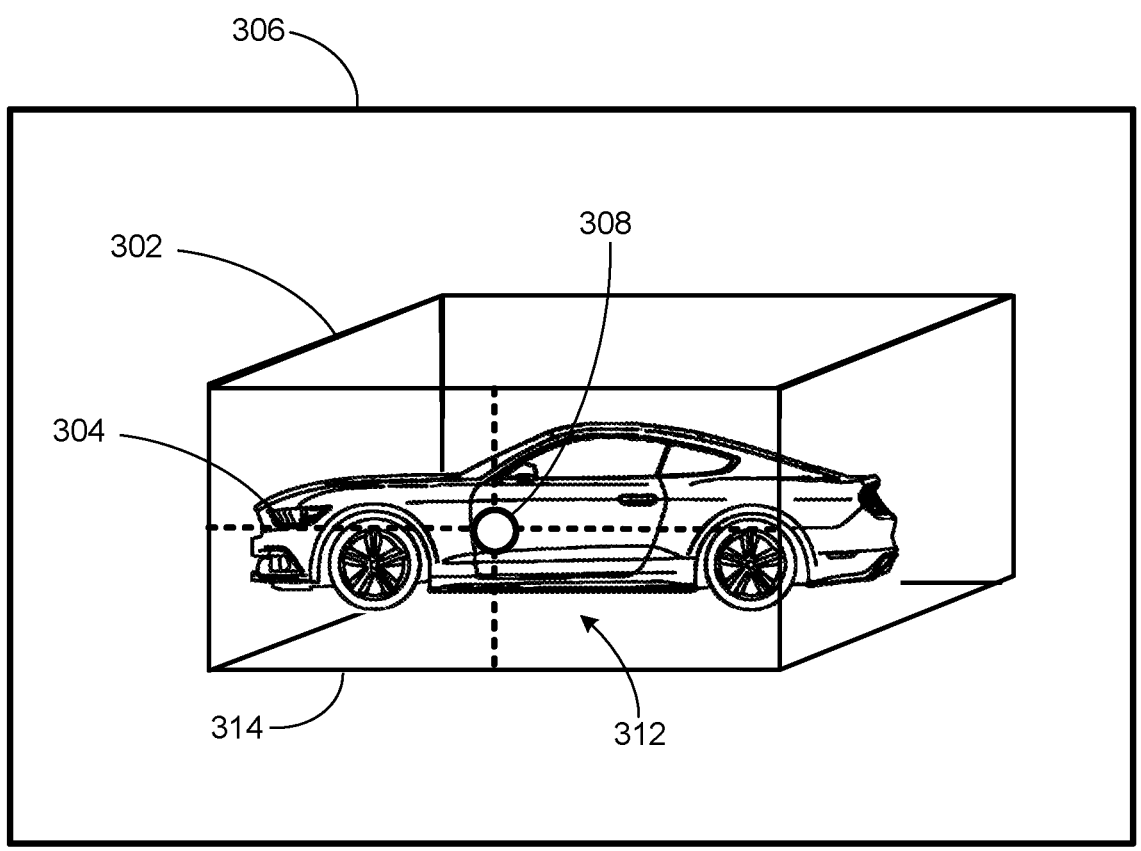
FIG. 3 is a diagram of an example bounding box.

FIG. 3 is a diagram of an example three-dimensional (3D) bounding box 302. 3D bounding box 302 is determined based on an image of an object, in this example a vehicle 304 included in an image 306, that can be acquired by a sensor 122 included in a traffic infrastructure system 105. 3D bounding box 302 can be determined by a server computer 120 included in a traffic infrastructure system 105 in communication with the sensor 122 that acquired the image 306. 3D bounding box 302 can be determined by inputting the image 306 to a deep neural network executing on server computer 120. An example of a deep neural network that can determine a 3D bounding box 302 for an object such as a vehicle 304 in an image 306 is CenterNet. CenterNet is a convolutional neural network available at the website https://github.com/xingyizhou/CenterNet, as of Sep. 2, 2021.

CenterNet inputs an image 306 and outputs a 3D bounding box 302 including a center point 308. Center point 308 is determined as the center 312 (dashed lines) of a two-dimensional (2D) bounding box 314 that is a face of the 3D bounding box 302. CenterNet software can also be trained to output a projection of the center of the 3D bounding box 302 onto the 2D bounding box 314 to improve correspondence of the projection of the center of the 3D bounding box 302 to the 3D center of vehicle 304 in images 306 acquired from differing points of view with respect to the vehicle 304. Determining a center point 308 in this fashion permits the location of the object, such as vehicle 304, to be represented by x, y pixel coordinates of a single point rather than the more cumbersome plurality of coordinates required to determine 3D bounding box 302. Camera parameters as above described in relation to FIG. 2 can be used to determine equations that describe the locations in global coordinates that correspond to a particular location in x, y pixel coordinates based on projective geometry. Projective geometry provides a mathematical basis for determining transformations that project points in a field of view 216, 218 of a camera 208, 210 onto a sensor plane that forms an image 306. Equations (1)-(x), below, illustrate the projective geometry-based system of equations for the projection of the center point 308 corresponding to the 3D bounding box 302 circumscribing the vehicle 304 into the image plane of each camera 208, 210. The system of equations can constrain a trajectory of a vehicle 304 in a global coordinate frame and constrain the relative pose of the cameras 208, 210 in the same global coordinate frame.

Figure 4:
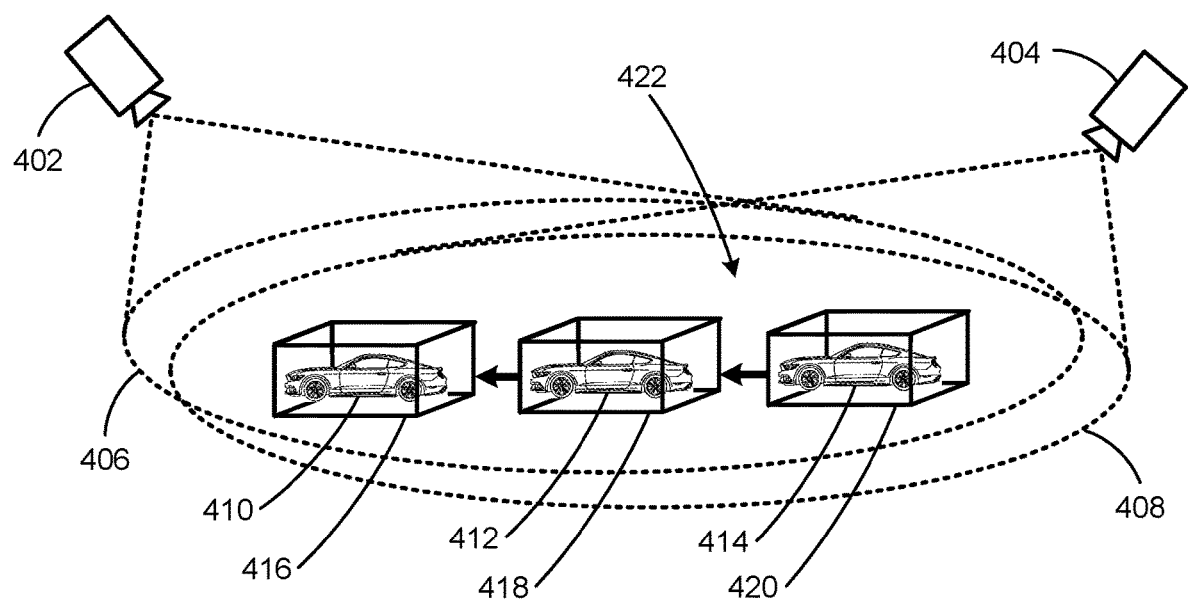
FIG. 4 is a diagram of example bounding boxes.

FIG. 4 is a diagram of a plurality of images which include vehicles 410, 412, 414 including 3D bounding boxes 416, 418, 420, respectively. Images of vehicles 410, 412, 414 are acquired by cameras 402, 404 included in a traffic infrastructure system 105 as the vehicle 410, 412, 414 travels through the overlap 422 between field of view 406, 408 of cameras 402, 404. At each position of vehicle 410, 412, 414 cameras 402, 404 each acquire an image of vehicle 410, 412, 414 at substantially the same time, i.e., within a few milliseconds, so that the vehicle 410, 412, 414 will be at the substantially same location within the fields of view 406, 408 of cameras 402, 404 i.e., within a few millimeters in global coordinates in corresponding pairs of images. The pairs of images of vehicles 410, 412, 414 can be input to a deep neural network included in a server computer 120 in a traffic infrastructure system 105 to determine pairs of 3D bounding boxes 416, 418, 420 and corresponding pairs of center points for each vehicle 410, 412, 414 position. This technique can be expanded to include a plurality of cameras 402, 404, all included in a traffic infrastructure system 105 and all having an overlap 422 between their respective fields of view 406, 408. Techniques disclosed herein can determine a series of non-linear equations that include a series of constraints between the 3D pose (Xi) of a detected and tracked vehicle 410, 412, 414 and the projections (zi) of the vehicle 410, 412, 414 onto the camera 402, 404 sensors.

Figure 5:
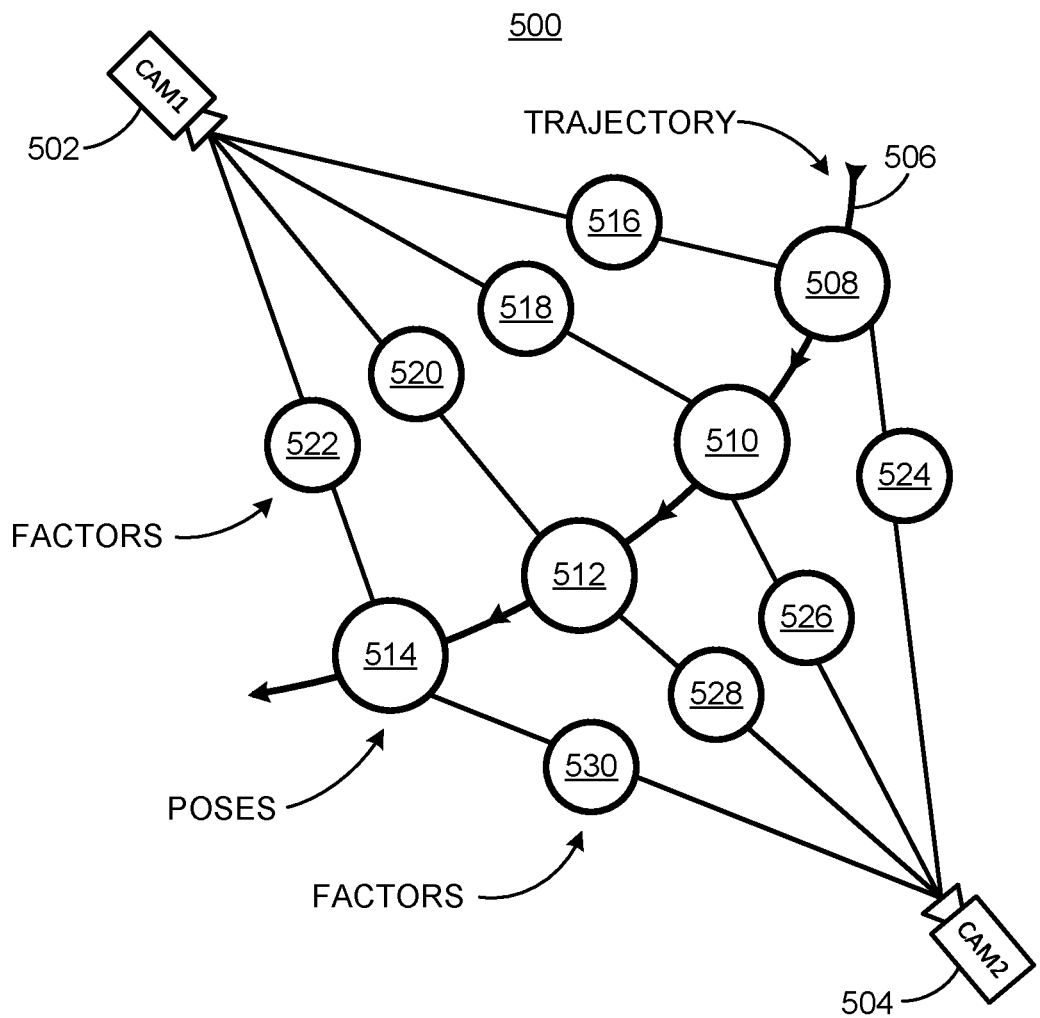
FIG. 5 is a diagram of an example factor graph.

FIG. 5 is a diagram of a factor graph 500 that includes a first camera (CAM1) 502, a second camera (CAM2) 504, and a plurality of 3D poses ($x_i$) of a vehicle, pose $x_1$ 508, pose $x_2$ 510, pose $x_3$ 512, and pose $x_4$ 514, as the vehicle travels along a trajectory 506. The factor graph 500 illustrates a plurality of non-linear equations based on center points of bounding boxes corresponding to locations of vehicles and locations of cameras including camera parameters corresponding to first and second cameras. A 3D pose is the six degree of freedom location and orientation of the vehicle at the times the cameras 502, 504 acquire each pair of images of the vehicle. Each observation of the 3D pose can be expressed as factor $\phi(c_1, x_1)$ 516, factor $\phi(c_1, x_2)$ 518, factor $\phi(c_1, x_3)$ 520, factor $\phi(c_1, x_4)$ 522, factor $\phi(c_2, x_1)$ 524, factor $\phi(c_2, x_2)$ 526, factor $\phi(c_2, x_3)$ 528, and factor $\phi(c_2, x_4)$ 530. Where each factor $\phi(c_1, x_1)$ 516, 518, 520, 522, 524, 526, 528, 530 is a function of a camera pose $c_1$ and a vehicle pose $x_1$. A joint posterior probability density of the system of equations that describes the camera poses $c_1$ and vehicle poses $x_1$ is given by:

$$\phi(x_1,x_2,x_3,x_4,c_1,c_2) = \phi(c_1,x_1)*\phi(c_1,x_2)*\phi(c_1,x_3)*\phi(c_1,x_4)*\phi(c_2,x_1)*\phi(c_2,x_2)*\phi(c_2,x_3)*\phi(c_2,x_4) \quad (1)$$

Each factor $\phi(c_j, x_i)$ 516, 518, 520, 522, 524, 526, 528, 530 is a residual based on an error between an observation of the vehicle's pose and a prediction of the vehicle pose estimated by the system of equations.

Each vehicle observation by a camera can be set up as an error constraint. A vehicle pose $x_i$ viewed from the first camera 502 gives an error term e1:

$$e1 = \|K_1 x_i - z_i^1\| \quad (2)$$

Where $K_1$ are the camera parameters for the first camera 502 and $z_i^1$ is the vehicle pose based on the ith image acquired by the first camera. Camera parameters correspond to the pose, which includes translation and rotation, of a camera with respect to the global coordinate system. The error term for the same vehicle pose $x_1$ viewed by the second camera 504 is given by:

$$e2 = \|K_2(T_1^2 x_i) - z_i^2\| \quad (3)$$

Where $T_1^2$ is an estimated transform between the second camera 504 pose and the first camera 502 pose, $K_2$ are the camera parameters for the first camera 502 and $z_i^2$ is the vehicle pose based on the ith image acquired by the second camera. Each residual for additional cameras is determined by an equation of the form:

$$\|e_i^j\| = \|K_j(T_1^j x_i) - z_i^j\| \quad (4)$$

Where j is the camera number, $K_j$ are the camera parameters for camera j, and $T_1^j$ is a transform between the camera j pose and the first camera 502 pose.

The solution of the factor graph is based on determining a maximum a posteriori (MAP) estimate $X_{MAP}^*$ of the parameters of the system of equations:

$$X_{MAP}^* = \mathrm{argmax}_x \Pi_i \phi_i(X_i) \quad (5)$$

Where each factor $\phi_i(X_i)$ is of the form:

$$\phi_i(X_i) = -\exp[-\tfrac{1}{2}\|K_j(T_1^j x_i) - z_i^j\|^2] \quad (6)$$

Because each factor determined by equation (6) corresponds to a Gaussian form, or negative exponential of an L2 norm, the negative log of equation (6) converts equation (5) to argmin form, yielding an equation to determine $X_{MAP}^*$, a vector that includes the poses and transformation parameters of a first camera 502 with respect to a second camera 504:

$$X_{MAP}^* = \mathrm{argmin}_x \Sigma_i \|K_j(T_1^j x_i) - z_i^j\| \quad (7)$$

Converting equation (7) to argmin form puts it in condition to be solved using least squares techniques. Least squares techniques describe mathematical techniques for solving systems of equations by changing input parameters in directions that minimize the squared differences between successive steps. The system of equations defined by equation (7) corresponds to a non-linear least squares problem because the observations of the vehicle poses are non-linear. Non-linear least squares equations can be solved by iterative techniques including the Levenberg-Marquardt algorithm and Gauss-Newton iteration. Techniques described herein use Gauss-Newton iteration to solve the system of non-linear equations.

Gauss-Newton iteration begins by selecting an initial solution $X^0$. Any value for $X^0$ can be used to start, however, choosing a starting point that is somewhat close to the final solution can speed up the algorithm. A starting point can be chosen based on previous results, for example. Gauss-Newton iteration begins by iterating the solution over time. At each step, a next step $X^{t+1}$ is determined based the result from the last step $X^t$ plus a gradient $\Delta_{gn}$:

$$X^{t+1} = X^t + \Delta_{gn} \quad (8)$$

Where the gradient $\Delta_{gn}$ is a directional derivative of the factor equations in (7) determined based on a direction that minimizes the next step. The direction can be determined by updating the gradient $\Delta_{gn}$ using a Jacobian matrix J of partial derivatives of the residuals relative to the variables being solved for:

$$\Delta_{gn} = -(J^T J)^{-1} J^T e \quad (9)$$

Where e is the error term being solved for from equation (4), above. The Jacobian matrix J of partial derivatives is defined as:

$$J_i^j = \begin{bmatrix} \delta e_i^j/\delta x & \delta e_i^j/\delta y & \delta e_i^j/\delta z & \delta e_i^j/\delta T_{1,x}^j & \delta e_i^j/\delta T_{1,y}^j & \delta e_i^j/\delta T_{1,z}^j \\ & \delta e_i^j/\delta T_{1,roll}^j & \delta e_i^j/\delta T_{1,pitch}^j & \delta e_i^j/\delta T_{1,yaw}^j & & \end{bmatrix} \quad (10)$$

Each observation and corresponding error term from each point in the trajectory 506 is used to assemble one Jacobian sub-matrix. The Jacobian sub-matrices are stacked to yield the final Jacobian matrix J to be solved for the gradient $\Delta_{gn}$. Error residuals from all points are used to solve for the vehicle trajectory $X_i = (x_1, x_2, x_3, x_4)$, where $x_1, x_2, x_3, x_4$ correspond to the 3D location of the objects and the six degree of freedom pose of the second camera 504 relative to the first camera 502, $T_i^j = [T_x\ T_y\ T_{roll}\ T_{pitch}\ T_{yaw}]$. This technique can be extended to more than two cameras 502, 504 by determining a Jacobian matrix J and gradient $\Delta_{gn}$ for each additional camera with respect to the first camera 502.

Once the six degree of freedom poses of each additional camera 504 is determined with respect to the first camera 502 in global coordinates, locations of objects determined by each of the cameras 502, 504 can be determined with respect to the same global coordinates and communicated to a vehicle 110 to permit a computing device 115 in the vehicle 110 to operate based on the object data. Sensors 116 included in vehicle 110, such as GPS or an accelerometer-based inertial measurement unit (IMU) can be used by computing device 115 to determine a location and direction of travel of the vehicle 110 in global coordinates. Data regarding the location of objects and the direction of travel of the objects can be used by computing device to determine a vehicle path upon which to operate which avoids the objects, for example. A vehicle path can be a polynomial function determined based on upper and lower limits on permitted latitudinal and longitudinal accelerations. Computing device 115 can transmit commands to controllers 112, 113, 114 to control vehicle powertrain, steering and brakes to permit vehicle 110 to travel on the determined vehicle path.

Techniques described herein can locate a plurality of cameras included in a traffic infrastructure system 105 having overlapping fields of view 216, 218 with a first camera 502. The entire group of located cameras can be located with respect to a global coordinate system by operating a vehicle 110 having GPS and IMU sensors 116 along a trajectory 506 and determining the vehicle 110 six degree of freedom pose at the times the cameras acquire the image data used to determine equation (7). A comparison of the locations determined by the sensors 116 included in the vehicle 110 with the locations determined by minimizing equation (7) can be used to locate the first camera 502 with respect to the global coordinate system and thereby locate the plurality of additional cameras. Techniques discussed herein can be used to located sensors included in a traffic infrastructure system on a continuous or ongoing basis without requiring inefficient, cumbersome, and/or time-consuming processes involving lidar sensors or fiducial markers, thereby improving the accuracy and reliability of data generated based on image data acquired by the sensors included in the traffic infrastructure system.

Figure 6:
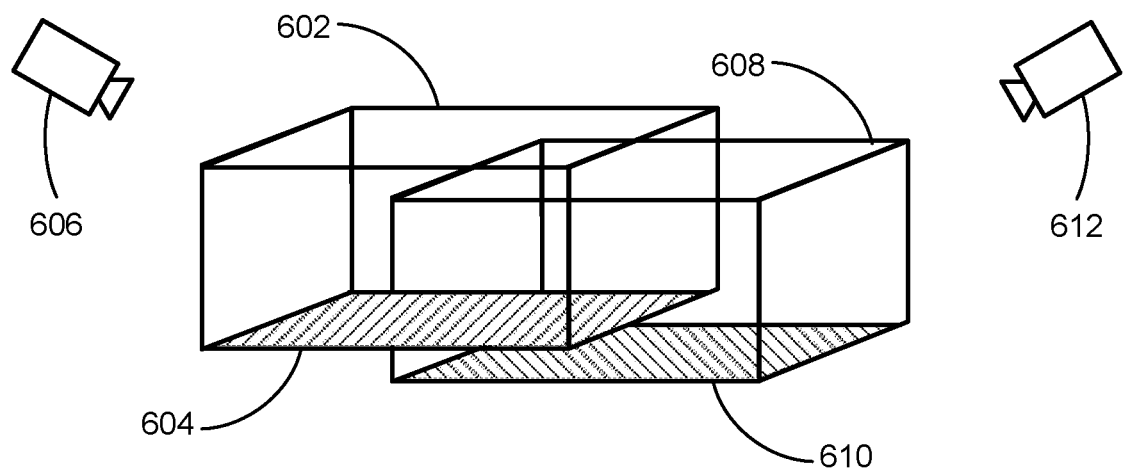
FIG. 6 is a diagram of example bounding boxes including ground planes.

FIG. 6 is a diagram of bounding boxes 602, 608 determined based on image data acquire by a first camera 606 and a second camera 612. Bounding boxes 602, 608 include ground planes 604, 610, respectively. Because bounding boxes 602, 608 are determined based on a vehicle traveling on a roadway within a relatively short distance, it can be assumed that the ground planes 604, 610 lie in the same plane. This can be used as an additional constraint for the solution of the system of equations in (7), above. Assuming that the ground plane 604 corresponding to the first camera 606 is defined by the equation:

$$ax + by + cz + d = 0 \quad (11)$$

If the ground plane 610 corresponding to the second camera 612 is defined as a vector $S^i = [s_x^i\ s_y^i\ s_z^i]$ and assuming the ground plane 610 is parallel to the first ground plane 604, then:

$$[a\ b\ c\ d] \begin{bmatrix} s_x^i \\ s_y^i \\ s_z^i \\ 1 \end{bmatrix} = 0 \quad (12)$$

A residual can be calculated based on the rotation $R_1^2$ and a translation in $z=t_1^2$:

$$e = \sum_{s^i} [a\ b\ c\ d] \begin{bmatrix} R_1^2 s^i + t_1^2 \\ 1 \end{bmatrix} \quad (13)$$

A Jacobian sub-matrix for the planar constraint can be determined for the x, y, z, roll, pitch, and yaw vehicle pose parameters and solved for six degree of freedom camera pose transform parameters.

$$J = \Sigma \begin{bmatrix} \delta e^{s^i}/\delta a\ \delta e^{s^i}/\delta b\ \delta e^{s^i}/\delta c\ \delta e^{s^i}/\delta d\ \delta e^{s^i}/\delta T_{1,x}^2\ \delta e^{s^i}/\delta T_{1,y}^2\ \delta e^{s^i}/\delta T_{1,z}^{j2} \\ \delta e_i^j/\delta T_{1,roll}^j\ \delta e_i^j/\delta T_{1,pitch}^j\ \delta e_i^j/\delta T_{1,yaw}^j \end{bmatrix} \quad (14)$$

The Jacobian sub-matrices can be stacked for the sets of plane parameters and point coordinates from a set of bounding box observations from pairs of cameras as discussed above and solved to determine a gradient $\Delta_{gn}$ to determine the next step to minimize the error.

Additional constraints can be used to increase the accuracy of the global coordinate estimate for the camera pose and speed up convergence of the Gauss-Newton iteration. For example, if the vehicle being imaged by the cameras as it travels on the trajectory 506 in equipped with a global positioning system (GPS) and/or inertial measurement unit (IMU), data regarding the six degree of freedom pose of the vehicle based on GPS data and/or IMU data can be input to the system of equations in the same manner as the ground plane constraints discussed above. In addition, if lidar based depth estimation of the location of the vehicle traveling on trajectory 506 is available, that data can also be input to the system of equations in the same manner as ground plane constraints discussed above. Another source of data that can be included in the system of equations is visual odometry data. Visual odometry is location and pose data determined by inputting image data acquired by sensors included in a vehicle to a deep neural network that includes high resolution map data corresponding to the environment around the vehicle. Based on high resolution map data and images of the environment, a deep neural network can be trained to determine where on the map the vehicle was located at the time the images were acquired. Another source of location data is high resolution mapping. Assuming the vehicle traveling on the trajectory 506 is maintaining a location in the center of a traffic lane, mapping data that describes the location of the traffic lane can be used to constrain the location of the vehicle and vehicle trajectory. These additional sources of location data can be input to the system of non-linear equations to improve the accuracy of the estimates of the location of the cameras included in the traffic infrastructure system.

Figure 7:
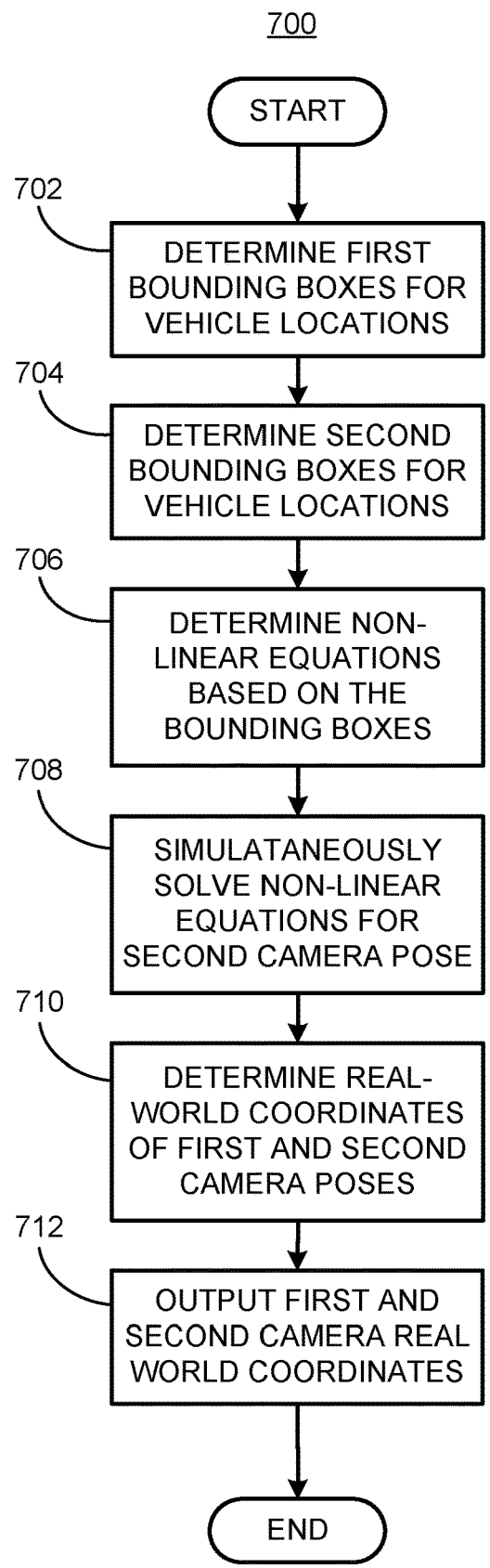
FIG. 7 is a flowchart diagram of an example process to locate a camera.

FIG. 7 is a diagram of a flowchart, described in relation to FIGS. 1-6, of a process determining real world coordinates of cameras 402, 404 included in a traffic infrastructure system 105. Process 700 can be implemented by a processor of a server computer 120, taking as input data from sensors 122, and executing commands, and outputting locations of objects. Process 700 includes multiple blocks that can be executed in the illustrated order. Process 700 could alternatively or additionally include fewer blocks or can include the blocks executed in different orders.

Process 700 begins at block 702, where images acquired by sensors 122 included in a traffic infrastructure system 105 are input to a server computer 120 as described in relation to FIGS. 3 and 4 to determine bounding boxes 416, 418, 420 for images of a vehicle 410, 412, 414 acquired at a plurality of first time steps by a first camera 402, where the first time step at which each image is acquired is recorded by server computer 120. First camera includes a field of view 406 that includes the images of the vehicle 410, 412, 414. The bounding boxes 416, 418, 420 can each include a center point 308 that identifies the center of each bounding box 416, 418, 420 as discussed in relation to FIG. 3, above.

At block 704 server computer 120 inputs images of a vehicle 410, 412, 414 acquired at a second plurality of time steps by a second camera 404 and determines bounding boxes 416, 418, 420 and center points for each bounding box 416, 418, 420. Second camera includes a field of view 408 that includes the images of the vehicle 410, 412, 414. The second time steps are determined by computer server computer 120 to occur at substantially the same as the first time steps, so that the center points of images of vehicles 410, 412, 414 based on images acquired by the first camera 402 will occur at the same locations in global coordinates as corresponding center points of images of vehicle 410, 412, 414 acquired by the second camera 404.

At block 706 server computer 120 determines a set of non-linear equations describing the six degree of freedom pose of the first and second cameras in global coordinates and the locations of center points of images of vehicles 410, 412, 414 in global coordinates as described above in relation to factor graph 500 in FIG. 5 and equations (10)-(7), above.

At block 708 server computer 120 solves the set of non-linear equations by Gauss-Newton iteration as described above in relation to FIG. 5 and equations (8)-(9), above to determine six degree of freedom poses for the second camera 404 with respect to the first camera 402 and locations of vehicles 410, 412, 414 in global coordinates.

At block 710 server computer 120 can determine global coordinates for the six degree of freedom poses for the first and second cameras 402, 404 by comparing the determined locations of the vehicles 410, 412, 414 to global coordinates of the vehicle locations determined by sensors included in the vehicle, for example GPS and IMU sensors and/or vehicle locations determined by visual odometry as discussed above in relation to FIG. 5.

At block 712 server computer 120 can output the real world coordinates of the six degree of freedom poses of the first and second cameras 402, 404 to a computing device 115 included in a vehicle 110. Server computer 120 can also output locations of objects detected in images acquired by first and second cameras 402, 404. As discussed above in relation to FIG. 4, process 700 can be extended to a plurality of cameras, a plurality of images of vehicles, and to sensors other than cameras such as lidar, radar, or ultrasound. Process 700 can also be extended to use constraints such as ground planes, location data uploaded from vehicles, and location data determined by sensors included in traffic infrastructure system 105 such lidar, radar, or ultrasound. After block 712 process 700 ends.

Figure 8:
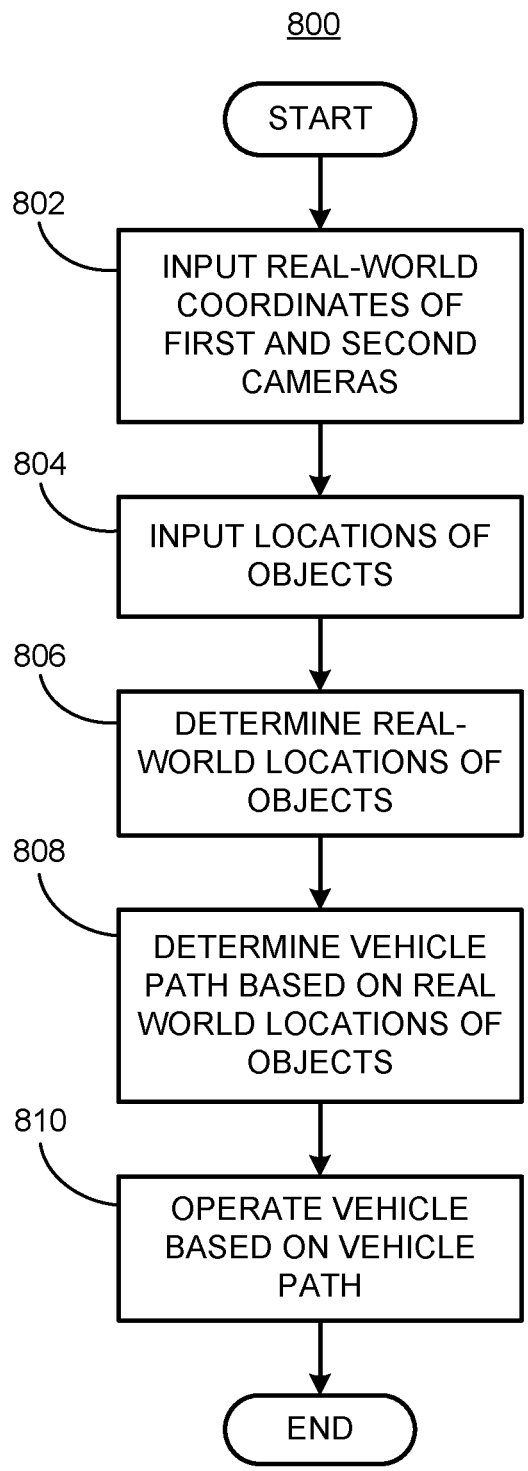
FIG. 8 is a flowchart diagram of an example process to operate a vehicle using a located camera.

FIG. 8 is a diagram of a flowchart, described in relation to FIGS. 1-7, of a process for operating a vehicle 110 based on camera and object location data downloaded from a traffic infrastructure system 105. Process 800 can be implemented by a processor of a computing device 115, taking as input data from server computer 120, and executing commands, and operating vehicle 110. Process 800 includes multiple blocks that can be executed in the illustrated order. Process 800 could alternatively or additionally include fewer blocks or can include the blocks executed in different orders.

Process 800 begins at block 802, where a computing device 115 in a vehicle 110 downloads data regarding real world locations of first and second cameras 402, 404 included in a traffic infrastructure system 105. The real world locations of first and second cameras 402, 404 can be determined by process 700 as discussed in relation to FIG. 7, above.

At block 804 computing device 115 downloads data regarding locations of one or more objects in the fields of view 406, 408 of cameras 402, 404. The objects can include vehicles and pedestrians, for example.

At block 806 computing device 115 can determine the real world coordinates of locations of the one or more objects downloaded at block 804. Computing device 115 can determine the six degree of freedom real world coordinates of the pose of vehicle 110 using sensors such as GPS, IMU, and/or visual odometry.

At block 808 computing device 115 can determine a vehicle path as described above in relation to FIG. 5, above based on the determined real world locations of objects in the fields of view 406, 408 of cameras 402, 404. The vehicle path can permit the vehicle 110 to operate while avoiding the objects, for example.

At block 810 computing device 115 can operate vehicle 110 on the determined vehicle path by controlling motion of the vehicle by controlling vehicle powertrain, steering, and brakes by outputting commands to controllers 112, 113, 114. Following block 810 process 800 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
determine a first plurality of center points of first two-dimensional bounding boxes corresponding to locations of a vehicle occurring in a first plurality of images acquired by a first camera;
determine a second plurality of center points of second two-dimensional bounding boxes corresponding to the locations of the vehicle occurring in a second plurality of images acquired by a second camera;
determine a plurality of non-linear equations based on respective locations of the first and second pluralities of center points and first and second camera locations including camera parameters corresponding to the first and second cameras;
simultaneously solve the plurality of non-linear equations for the locations of the vehicle with respect to the first and second cameras and a six degree of freedom pose of the second camera with respect to the first camera;
determine real-world coordinates of the six degree of freedom pose of the second camera based on real-world coordinates of a six degree of freedom pose of the first camera; and
transmit the real-world coordinates of the six degree of freedom pose for the first camera, and the real-world coordinates of the six degree of freedom pose for the second camera to a second computer included in a vehicle to control the motion of the vehicle.

2. The computer of claim 1, wherein first and second camera parameters include the six degree of freedom poses of the first and second cameras.

3. The computer of claim 1, wherein the real-world coordinates of the first camera are determined by locating the first camera using lidar data.

4. The computer of claim 1, the instructions including further instructions to determine the first and second plurality of center points based on first and second bounding boxes by inputting the first and second pluralities of images to a convolutional neural network.

5. The computer of claim 1, the instructions including further instructions to solve the plurality of non-linear equations using Gauss-Newton iteration.

6. The computer of claim 5, wherein solving the plurality of non-linear equations using Gauss-Newton iteration includes determining a Jacobian matrix of partial derivatives.

7. The computer of claim 1, the instructions including further instructions to solve the non-linear equations using a Levenberg-Marquardt algorithm.

8. The computer of claim 1, wherein simultaneously solving the plurality of non-linear equations for the locations of the vehicle with respect to the first and second cameras and the six degree of freedom pose of the second camera with respect to the first camera includes constraining the first and second two-dimensional bounding boxes to a plane.

9. The computer of claim 1, wherein simultaneously solving the plurality of non-linear equations for the locations of the vehicle with respect to the first and second cameras and the six degree of freedom pose of the second camera with respect to the first camera includes constraining the locations of the vehicle based on lidar data.

10. The computer of claim 1, wherein simultaneously solving the plurality of non-linear equations for the locations of the vehicle with respect to the first and second cameras and the six degree of freedom pose of the second camera with respect to the first camera includes constraining the locations of the vehicle based on one or more of global positioning system data, inertial measurement unit data and visual odometry data.

11. The computer of claim 1, wherein simultaneously solving the plurality of non-linear equations for the locations of the vehicle with respect to the first and second cameras and the six degree of freedom pose of the second camera with respect to the first camera includes constraining the locations of the vehicle based on map data.

12. The computer of claim 1, wherein simultaneously solving the plurality of non-linear equations for the locations of the vehicle with respect to the first and second cameras and the six degree of freedom pose of the second camera with respect to the first camera includes constraining the locations of the vehicle based on center points determined based on three-dimensional bounding boxes.

13. A method, comprising:
  determining a first plurality of center points of first two-dimensional bounding boxes corresponding to a vehicle occurring in a first plurality of images acquired by a first camera;
  determining a second plurality of center points of second two-dimensional bounding boxes corresponding to the vehicle occurring in a second plurality of images acquired by a second camera;
  determining a plurality of non-linear equations based on respective locations of the first and second pluralities of center points and first and second camera locations including camera parameters corresponding to the first and second cameras;
  simultaneously solving the plurality of non-linear equations for the locations of the vehicle with respect to the first and second cameras and a six degree of freedom pose of the second camera with respect to the first camera;
  determining real-world coordinates of the six degree of freedom pose of the second camera based on real-world coordinates of a six degree of freedom pose of the first camera; and
  transmit the real-world coordinates of the six degree of freedom pose for the first camera, and the real-world coordinates of the six degree of freedom pose for the second camera to a second computer included in a vehicle to control the motion of the vehicle.

14. The method of claim 13, wherein first and second camera parameters include the six degree of freedom poses of the first and second cameras.

15. The method of claim 13, wherein the real-world coordinates of the first camera are determined by locating the first camera using lidar data.

16. The method of claim 13, further comprising determining the first and second plurality of center points based on first and second bounding boxes by inputting the first and second pluralities of images to a convolutional neural network.

17. The method of claim 13, further comprising solving the plurality of non-linear equations using Gauss-Newton iteration.

18. The method of claim 17, wherein solving the plurality of non-linear equations using Gauss-Newton iteration includes determining a Jacobian matrix of partial derivatives.

19. The method of claim 18, wherein solving the plurality of non-linear equations using Gauss-Newton iteration includes determining a Jacobian matrix of partial derivatives.

20. The method of claim 13, the instructions including further instructions to solve the non-linear equations using a Levenberg-Marquardt algorithm.

* * * * *